May 19, 1936. H. T. WOOLSON 2,041,506
MOTOR MOUNTING
Filed Oct. 10, 1932 2 Sheets-Sheet 1

INVENTOR.
HARRY T. WOOLSON.
BY
ATTORNEYS.

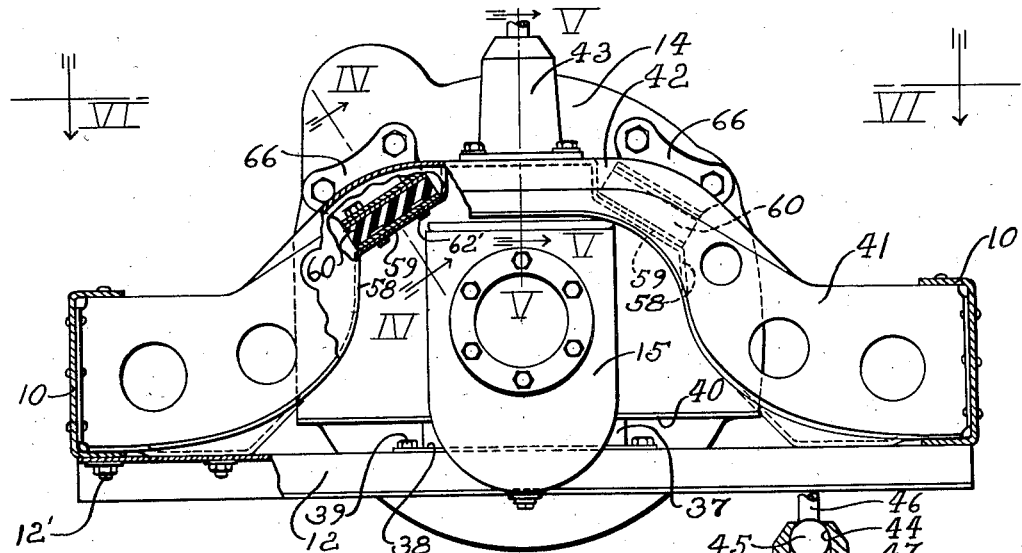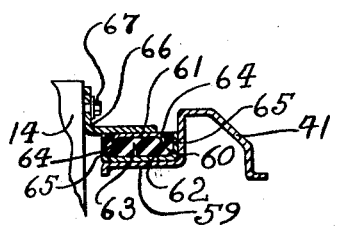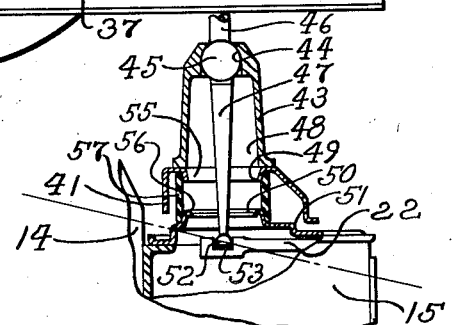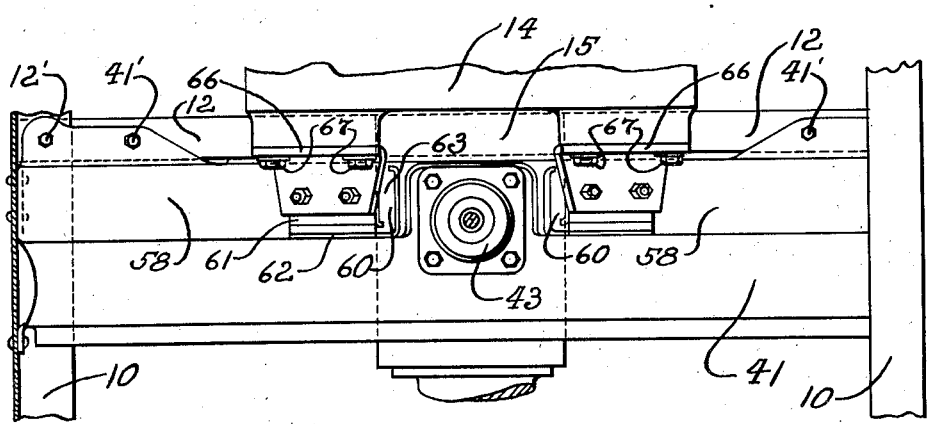

Patented May 19, 1936

2,041,506

UNITED STATES PATENT OFFICE 2,041,506

MOTOR MOUNTING

Harry T. Woolson, Detroit, Mich., assignor to Chrysler Corporation, Detroit, Mich., a corporation of Delaware Application October 10, 1932, Serial No. 637,037

19 Claims. (Cl. 180—64)

This invention relates to an improved mounting for engines such as internal combustion engines of the type used in propelling vehicles and it has particular relation to a novel form and arrangement of mounting members which permit a limited amount of movement of the engine.

More specifically, this invention provides a means of supporting an engine of the character which has clutch and variable speed transmission mechanisms rigidly assembled together as a unit in such a manner that the entire unit may oscillate during operation under the influence of the torque reaction and other forces acting thereon. In certain installations of this character, that part of the transmission of the engine unit with which the gear shift lever connects has been caused to move sufficiently to impart vibration of considerable amplitude to the gear shift lever. The upper portion of a gear shift lever which extends, above its swivel support, into a passenger compartment of a vehicle is much longer than the lower section of the lever which extends from the swivel support into the transmission casing and consequently only a slight movement of the lower end of the lever by the oscillatory movement of the engine causes excessive movement of the upper section of the lever.

My improved engine mounting and the arrangement of mounting members embodied therein allow substantial movement of the engine under the influence of the forces to which it is subjected so as to prevent the direct application of such forces upon the frame and body structure of the engine, and the members of the mounting which yieldably oppose oscillation of the unit under the torque reaction thereof also cause the portion of the transmission in the vicinity of the parts thereof which connect with the gear shift lever to remain in a comparatively fixed relation with respect to the frame structure of the vehicle. This is accomplished by disposing the torque resisting members in such a manner as to hold the portion of the transmission with which the gear shift lever connects against displacement and to bring the axis about which the oscillatory movement of the unit occurs into close proximity of the junction of the shifter bars of the transmission and the lower end of the gear shift lever. Application of shock and vibration upon the chassis and body structure is also guarded against in my improved engine mounting by providing yieldable material in the mounting members having the proper characteristics and by positioning the members in such a relation that the axis about which the engine is oscillated under the influence of the torque reaction impulses and other forces passes in the vicinity of the center of mass of the engine unit, as well as in the vicinity of or substantially through the junction of the gear shift lever and shifter bars.

One of the main objects of the invention is to provide an improved engine mounting which permits oscillatory movement of an engine unit with comparatively little or no displacement of the center of mass of the unit and which causes the junction of the gear shift lever and the shifter bars to remain in substantially fixed relation to the chassis frame during such oscillatory movement.

A further object of the invention is to provide a mounting of this character which supports the weight of the engine unit at locations that are spaced apart substantially less than the length of the unit so as to prevent longitudinal deflection of the central portions thereof and to permit the use in the unit of structural parts that are light in weight.

Other objects of the invention are to provide yieldable means of a resilient nature in mounting members of this character for opposing oscillatory movement of the unit by the torque reaction impulses of the engine; to provide a pair of such members which are arranged so as to cause their respective yieldable elements to extend inwardly toward the central plane of the engine unit at opposite inclinations to the horizontal and subtantially in encompassing relation to the junction of the gear shift lever and shifter bars; to provide inclined mounting members of this type which, if desired, can be relied upon to yieldably oppose the torque reaction of the engine in the absence of other means especially designed for this purpose; to provide members for opposing oscillatory movement of the unit under the torque reaction impulses of the engine which are fixed to the unit in such a manner as to permit removal of the transmission mechanism and housing while the crankcase, clutch housing, and other structures carried thereby, are retained in their normal positions and supported by the chassis frame; and to provide a yieldable sleeve between the gear shift lever support and the transmission casing of the unit for sealing the opening in the latter against the admission of dirt and other foreign matter.

An illustrative embodiment of the invention is shown in the accompanying drawings, in which:

Fig. 3 is a transverse sectional view taken on the line III—III of Fig. 1.

Fig. 4 is a fragmentary sectional view taken on the line IV—IV of Fig. 3.

Fig. 5 is a fragmentary vertical sectional view taken on the line V—V of Fig. 3.

Fig. 6 is a fragmentary plan view, partly in section, showing the rear end portion of the engine unit as viewed from the line VI—VI of Fig. 3.

Figure 1:
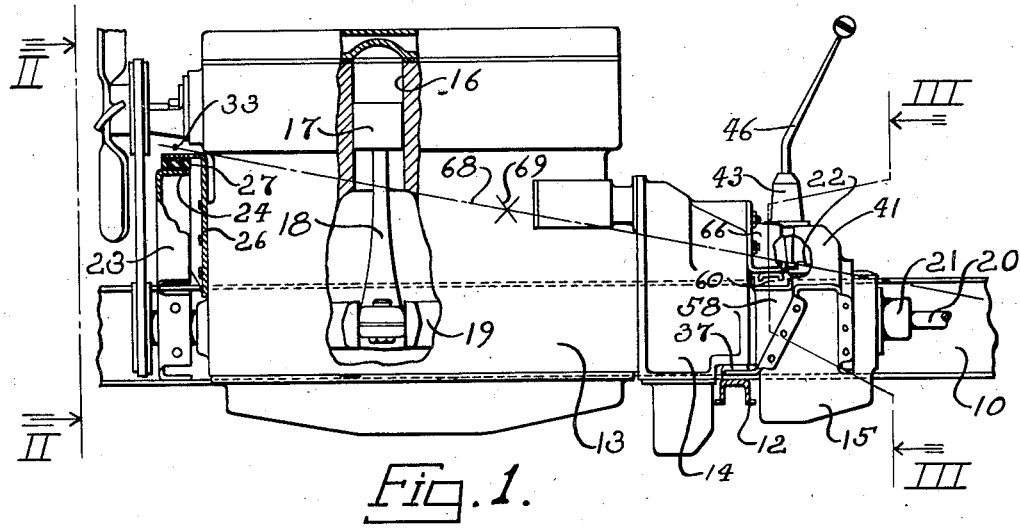
Fig. 1 is a side view, partly in elevation and partly in section, of an internal combustion engine mounted according to my invention in a chassis frame of a vehicle.

In the form shown, the improved internal combustion engine mounting is illustrated in conjunction with a vehicle chassis frame which includes longitudinally extending channel members 10 and rigid transversely disposed front and rear members 11 and 12, respectively, which are secured to the longitudinal side members by rivets or other suitable means. The transverse frame member 11 is located at the front end of the vehicle chassis frame and the transverse frame member 12 is spaced rearwardly therefrom a distance substantially equal to the combined lengths of the crankcase 13 and clutch housing 14 of the engine. The crankcase 13 is received between the longitudinal channel members 10 and the clutch and transmission housings 14 and 15, respectively, are rigidly fixed together and to the crankcase and are longitudinally aligned therewith.

The internal combustion engine is of the multiple cylinder type having cylinders 16, only one of which is shown. Slidably mounted in each cylinder is a reciprocating piston 17 to which is pivotally attached a connecting rod 18, which is journaled at its lower end on a crankshaft 19 in the usual manner. A clutch mechanism (not shown) within the housing 14 connects the crankshaft 19 with transmission mechanism within the housing 15 in a conventional manner and the transmission mechanism in turn drives a propeller shaft 20 through a universal or other flexible joint 21. Only the shifter bars 22 of the transmission mechanism are disclosed.

Figure 2:
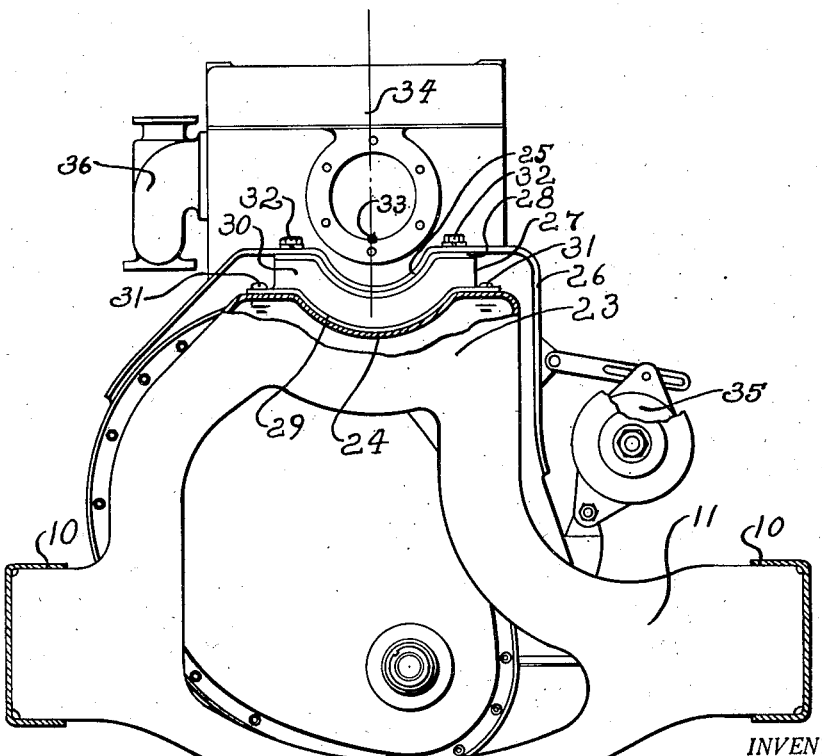
Fig. 2 is a transverse sectional view taken on the line II—II of Fig. 1.

The transverse member 11 of the frame structure has an upstanding intermediate portion 23, best shown in Fig. 2, on which is formed an arcuate shaped portion 24 which forms a support for and registers with a correspondingly shaped member 25 constituting a portion of an upstanding bracket 26, which is fixed on the front end of the crankcase 13. Disposed intermediate the arcuate shaped portions 24 and 25 is a support 27 which includes a pair of metallic plates 28 and 29, having correspondingly shaped arcuate portions which register with and substantially conform to the curvature of the arcuate members 24 and 25, and a rubber element 30 disposed between the plates 28 and 29 and rigidly fixed to the adjacent faces thereof, preferably by vulcanization. The lower plate 29 is secured to the arcuate portion 24 of the cross member 11 by means of bolts 31, and the upper plate 28 is secured to the bracket 26 by bolts 32 which extend through registering apertures in the bracket 26 and in the plate 28.

The rubber connection between the plates 28 and 29 permits the plate 28 to oscillate relative to the transverse frame member 11 about a substantially definite point designated by the numeral 33 and preferably located in a plane 34 in which the center of mass of the engine lies. As shown, at the front end of the unit, this vertical plane is offset somewhat to the left of the vertical plane containing the axis of the crankshaft 19. The location of this vertical plane may, however, vary within substantially wide limits in various engines, depending upon the distribution of the weight of the parts thereof, such as the generator 35, manifold 36, and diverse other auxiliary structures. The curvature of the plates 28 and 29 holds the front part of the engine against transverse movement and, together with the thickness and character of the rubber 30, predetermines the location of the point 33 about which the plate 28 is free to oscillate. As the plate 28 is fixed to the engine, the structure of the front support 27 establishes one of the points that determine the axis about which the engine may oscillate. The front mounting 27 supports the weight of the front end of the engine and, preferably, the entire remaining weight of the engine is supported by a rubber block 37, best shown in Fig. 3, fixed to a metal plate 38, preferably by vulcanization, which is secured to the transverse frame member 12 by bolts 39. The rubber block 38 registers with and engages a substantially flat lower surface 40 of the rear end portion of the clutch housing 14. The rubber block 37 may, if desired, be fixed to the portion of the clutch housing with which it engages or to the plate 38, or may be fixed to both of these members, depending upon the characteristics desired. By providing a support of this character at the rear end of the clutch housing, the occurrence of a long span between the front and rear supports is avoided and the necessity of adding additional thickness to the various parts to secure rigidity is eliminated and the transmission mechanism may be detached and removed while the crankcase and clutch mechanism of the unit is supported in its usual manner.

The frame structure is provided with a third transverse member 41 which is fixed at its end portions to the longitudinal channel members 10 and to the transverse frame member 12 by bolts 12' or other suitable means. The rear transverse member 12 is fixed to the transverse member 41 between the longitudinal channel members 10 by bolts 41' so as to provide a unitary structure. These bolts may be relied upon to secure the rear transverse member 12 to the chassis frame if desired, and in this event it is unnecessary to fix the ends of the member 12 to the longitudinal channel members. This transverse member has a bowed central portion 42 extending over the transmission housing 15. Rigidly mounted on the central portion 42 of the transverse member 41 is a gear shift lever dome 43 which is located directly above the transmission housing 15. The gear shift lever dome is provided with a concave seat 44 in which a ball portion 45 of a gear shift lever 46 is swiveled. The lower end portion 47 of the gear shift lever extends through the registering openings 48, 49, and 50 in the lower end of the dome 43, transverse member 41, and cover 51 of the transmission housing, respectively. Formed on the lower extremity of the gear shift lever is a knob 52 which is receivable in notches 53 of the gear shifter bars 22 of the transmission. The transverse member 41 and transmission cover 51 are provided with registering flanges 55 and 56 which extend toward each other and which surround the openings 49 and 50, respectively. A flexible collar 57, preferably comprising rubber, is disposed around the registering flanges 55 and 56 in such a manner as to seal the opening 50 in the transmission cover against the admission of dirt, dust, and other foreign matter.

The central bowed part 42 of the cross member 41 is provided with a forwardly extending flange 58 on which are formed inwardly extending and inclined flat seat portions 59. The flat portions 59 are disposed above and on opposite sides of the transmission housing 15. Mounted on each flat portion 59 of the flange 58 is a torque opposing member 60 which includes a pair of spaced channel-like plates 61 and 62 having a pad of rubber 63 therebetween and fixed to the adjacent sides of the plates, preferably by vulcanization. The upper plate 61 has side flanges 64 extending transversely of the unit and located between and in spaced relation to transversely extending side flanges 65 of the channel-like plates 62. Portions of the rubber pad 63 are interposed between the plates 61 and 62 and the flanges 64 and 65 thereof, respectively, so as to yieldably hold the unit against movement in the direction of its length. The upper plate 61 of each torque opposing member is rigidly fixed to a bracket 66 which is secured by bolts 67, or other suitable means, to the rear end wall of the clutch housing 14 and the lower plate 62 is fixed to the transverse member by bolts 62'.

These torque opposing members are substantially free from the weight of the engine and they are disposed substantially tangent to a circle having its center located within the boundaries of the transmission housing and in encompassing relation with respect to the junction of the gear shift lever 46 and the shifter bars 22 so as to yieldably hold the portion of the transmission with which the gear shift lever connects against movement relative to the chassis frame. In this way, the torque opposing members assist in bringing the axis 68, diagramatically illustrated in Fig. 1, with respect to which the unit is oscillated under the influence of the torque reaction impulses, within close proximity of the junction of the gear shift lever and shifter bars. The point 33 on the axis 68 which is established by the front mounting member 27 is preferably located so as to bring the axis substantially through or within close proximity of the center of the mass of the engine, diagrammatically illustrated at 69.

The inclined rubber pads 60 hold the unit against excessive lateral movement and they also tensionally oppose oscillatory movement of the engine. As these pads are relieved of substantially all weight supporting function by the mounting members 27 and 37, their characteristics can be conveniently predetermined to bring the natural vibration frequency of the unit below the frequency of the torque reaction impulses at the lower end of the driving range of the engine. Such construction prevents the occurrence of the torque reaction impulses in synchronous or phased relation with the natural vibration frequency of the unit upon its mountings during operation above the lower end of the driving range of the engine. All of the advantages of avoiding displacement of the center of mass of the engine in response to the torque reaction impulses, such as the elimination of objectionable side-sway of the chassis frame and application of transversely directed shock thereon, are obtained without causing objectionable movement of the gear shift lever.

Although but one specific embodiment of the invention is herein shown and described, it will be understood that various changes in the size, shape, and arrangement of parts may be made without departing from the spirit of my invention, and it is not my intention to limit its scope other than by the terms of the appended claims.

What I claim is:

1. A mounting for an internal combustion engine unit including a multiple cylinder internal combustion engine and variable speed transmission mechanism and for a gear shift lever operatively connected at one end with said transmission mechanism, comprising a frame structure, means rigidly mounted on said frame structure for supporting said lever in swiveled relation, means for oscillatively mounting said engine unit on said frame structure about an axis passing substantially through the point of connection between said gear shift lever and transmission mechanism, and torque opposing means for yieldably opposing oscillatory movement of said engine, said torque opposing means and said mounting means being so constructed and arranged as to restrain displacement of the portion of said unit at which said point is located relative to said frame structure.

2. A mounting for an internal combustion engine unit including a multiple cylinder internal combustion engine and variable speed transmission mechanism and for a gear shift lever operatively connected at one end with said transmission mechanism, comprising a frame structure, means rigidly mounted on said frame structure for supporting said lever in swiveled relation, and means for oscillatively mounting said engine unit on said frame structure about an axis passing substantially through the point of connection between said gear shift lever and transmission mechanism and passing within close proximity of the center of mass of said unit and resilient torque opposing means for yieldably opposing oscillatory movement of said engine, said torque opposing means being so constructed and arranged as to oppose displacement of the portion of said unit at which said point is located relative to said frame structure.

3. A mounting for an internal combustion engine unit including a multiple cylinder internal combustion engine and variable speed transmission mechanism and for a gear shift lever operatively connected at one end with said transmission mechanism, comprising a frame structure, means rigidly mounted on said frame structure for supporting said lever in swiveled relation, means mounted on said frame structure for oscillatively supporting said unit including a pair of longitudinally spaced mounting members each having a resilient element interposed between said frame structure and unit, and means substantially free from the weight of said unit for opposing oscillatory movement thereof including resilient members interposed between said unit and frame structure and having parts aligned laterally with the portion of said transmission mechanism with which said lever connects for retaining such portion of said transmission against displacement relative to said frame structure.

4. In combination, an engine unit including a variable speed transmission, a frame structure, a gear shift lever support mounted on said frame structure having a gear shift lever swiveled thereon and connected with said transmission mechanism, a plurality of resilient mounting members interposed between said frame structure and said engine unit oscillatively supporting the latter, and torque opposing members having portions located substantially at the elevation of the connection of said gear shift lever and transmission mechanism and having portions extending below and above said elevation and adapted to restrain that portion of the transmission mechanism with which said lever connects against displacement relative to said frame structure during oscillatory movement of said unit.

5. A mounting for an internal combustion engine unit having transmission mechanism at one end including a frame structure, a member mounted on said frame structure for oscillatively supporting one end portion of said unit, and means mounted on said frame structure intermediate the length of said unit for oscillatively supporting the central and rear end portions thereof, and a pair of yieldable torque resisting elements disposed in a transverse plane of and above the upper elevation of said transmission mechanism and extending inwardly toward the central vertical plane thereof at opposite inclinations to the horizontal respectively.

6. A mounting for an internal combustion engine unit including a multiple cylinder internal combustion engine and variable speed transmission mechanism and for a gear shift lever operatively connected at one end with said transmission mechanism, comprising a frame structure, a transverse member on said frame structure having a central portion extending over said transmission, means mounted on said transverse member for supporting said lever in swiveled relation, a pair of mounting members having resilient elements sustaining the weight of said unit and oscillatively supporting the latter, and torque opposing members on the central portion of said transverse member above said transmission each having a resilient element fixed to said clutch housing.

7. A mounting for an internal combustion engine unit including rigidly connected longitudinally aligned crankcase, clutch housing and transmission housing, comprising a frame structure, longitudinally spaced mounting members interposed between said frame structure and unit, each including a resilient weight supporting element for oscillatively supporting said unit, a transverse member fixed on said frame structure having a central bowed portion extending over said transmission housing, and resilient torque resisting members each having a rubber pad fixed on its upper side to said unit above said transmission housing and fixed on its opposite side to the bowed portion of said transverse member, said pads being substantially free from deflection under the weight of said engine and adapted to tensionally resist oscillatory movement of said engine.

8. A mounting for an internal combustion engine unit including rigidly connected logitudinally aligned crankcase, clutch housing and transmission housing, comprising a frame structure, longitudinally spaced mounting members interposed between said frame structure and unit, each including a resilient weight supporting element for oscillatively supporting said unit, a transverse member fixed on said frame structure having a central bowed portion extending over said transmission housing, and a pair of torque resisting members each having a rubber pad located at least in part in vertically and laterally registering relationship with respect to said transmission, disposed substantially tangent to a circle having a center within the boundaries of said transmission housing and having the opposite sides fixed to said unit and to the bowed portion of said transverse member respectively.

9. A mounting for an internal combustion engine unit including rigidly connected longitudinally aligned crankcase, clutch housing, and transmission, comprising a frame structure, a mounting member between the front end of said unit and said frame structure having resilient weight supporting element located above the elevation of said transmission, a mounting member on said frame structure located substantially at the junction of said transmission and clutch housing having a resilient weight supporting element located below the crankshaft of said unit cooperating with said front mounting member in oscillatively supporting the weight of said engine, and resilient torque resisting members each having a pad fixed on one side to said unit above said transmission housing and fixed on their opposite sides to the bowed portion of said transverse member, said pad being substantially free from compression under the weight of said engine and adapted to tensionally resist oscillatory movement of said engine.

10. A mounting for an internal combustion engine unit including a multiple cylinder internal combustion engine and variable speed transmission mechanism and for a gear shift lever operatively connected at one end with said transmission mechanism, comprising a frame structure, a transverse member mounted on said frame structure and extending over said transmission mechanism, means mounted on said transverse member for supporting said lever, resilient members interposed between said frame structure and said unit for oscillatively supporting the latter, and torque opposing members each having a rubber pad fixed to said unit and to said transverse member respectively and located in embracing relation to the connection of said lever and transmission mechanism for limiting oscillation of the portion of the latter with which said lever connects during oscillatory movement of said unit.

11. A mounting for an internal combustion engine unit including rigidly connected longitudinally aligned crankcase, clutch housing, and transmission housing, comprising a frame structure, longitudinally spaced mounting members interposed between said frame structure and unit having rubber elements sustaining the weight of said unit and oscillatively supporting the latter, a rubber pad fixed on said frame structure and located adjacent the rear end of said clutch housing, and a bracket mounted on said clutch housing and fixed to said rubber pad so as to yieldably oppose oscillatory movement of said engine, said bracket having flanges extending laterally of the length of said engine and embedded in said rubber pad for opposing movement of said unit in the direction of its length.

12. A mounting for an internal combustion engine unit including rigidly connected longitudinally aligned crank-case, clutch housing, and transmission housing comprising a frame structure having a rigid transverse element extending over said transmission housing adjacent the rear end of said clutch housing, longitudinally spaced mounting members interposed between said frame structure and said unit having rubber elements sustaining the weight of said unit and oscillatively supporting the latter, a pair of rubber pads having lower sides fixed on said rigid transverse element substantially at the upper elevation of and in a transverse plane of said transmission housing, one on each side thereof, and a pair of brackets mounted on said clutch housing, one fixed to the upper side of each of said rubber pads for yieldably opposing oscillatory movement of said engine.

13. A mounting for an internal combustion engine unit including an internal combustion engine and a variable speed transmission mechanism having a casing provided with an opening and for a gear shift lever extending through said opening and operatively connected at one end with said mechanism, comprising a frame structure, a gear shift lever support on said frame structure registering with the opening in said transmission casing, resilient members interposed between said frame structure and said unit for oscillatively supporting the latter, and a flexible collar surrounding said opening and a portion of said lever and extending between said gear shift lever support and transmission casing.

14. In combination, an internal combustion engine unit including an internal combustion engine and a variable speed transmission mechanism having a casing provided with an opening, a frame structure including spaced cross members, a gear shift lever dome mounted on one of said cross members, a gear shift lever swiveled in said dome having an end portion extending through said opening and operatively connected with said transmission mechanism, resilient mounting members interposed between the other cross members and said unit for oscillatively supporting the latter, and a resilient member surrounding said opening and extending between said second cross member and said transmission casing.

15. A mounting for an internal combustion engine unit having transmission mechanism at one end including a frame structure, a member mounted on said frame structure for oscillatively supporting one end portion of said unit, means mounted on said frame structure intermediate the length of said unit for oscillatively supporting the central and rear end portions thereof, and a yieldable torque resisting element disposed above said transmission mechanism extending inwardly toward the central vertical plane thereof at an inclination to a horizontal plane and having upper and lower sides fixed to overlapping surfaces on said unit and frame structure respectively.

16. A mounting for an internal combustion engine unit including a frame structure, means mounted on said frame structure for oscillatively supporting said unit, and a yieldable torque resisting element extending over an intermediate portion of said unit at an inclination to both horizontal and vertical planes and fixed to said unit and frame structure respectively, said torque resisting member including a pair of spaced plates having flanges extending inwardly from their adjacent sides and including an intermediate rubber pad having portions between said flanges and being constructed and arranged to restrain said unit against longitudinal movement in at least one direction by compression of said portion of said rubber pad between said flanges and to restrain a selected portion thereof against lateral movement.

17. A mounting for an internal combustion engine unit including a frame structure, means mounted on said frame structure for oscillatively supporting said unit, and a torque resisting member having a rubber pad extending over an intermediate portion of said unit at an inclination to both horizontal and vertical planes, the upper side of said rubber pad being fixed to said unit and the lower side thereof being fixed to said frame structure respectively.

18. A mounting for an internal combustion engine unit including a multiple cylinder internal combustion engine and variable speed transmission mechanism and for a gear shift lever operatively connected at one end with said transmission mechanism, comprising a frame structure, means rigidly mounted on said frame structure for supporting said lever in swiveled relation, means mounted on said frame structure for oscillatively supporting said unit, and means substantially free from the weight of said unit for opposing oscillatory movement thereof including a resilient member interposed between said unit and frame structure and having portions at the elevation of and aligned laterally with the portion of said transmission mechanism with which said lever connects for restraining such transmission portion against displacement relative to said frame structure.

19. A mounting for an internal combustion engine unit including a multiple cylinder internal combustion engine and variable speed transmission mechanism and for a gear shift lever operatively connected at one end with said transmission mechanism, comprising a frame structure, means rigidly mounted on said frame structure for supporting said lever in swiveled relation, means mounted on said frame structure for oscillatively supporting said unit, and means for opposing oscillatory movement of said unit including a resilient member having a part at substantially the elevation of and aligned substantially laterally of said unit with the portion of said transmission with which said lever is connected and fixed to said unit and said frame structure respectively for restraining displacement of said portion of said transmission mechanism relative to said frame structure.

HARRY T. WOOLSON.